United States Patent [19]

Verbrugge

[11] Patent Number: 5,284,571
[45] Date of Patent: Feb. 8, 1994

[54] METHOD OF MAKING ELECTRODES FOR ELECTROCHEMICAL CELLS AND ELECTRODES MADE THEREBY

[75] Inventor: Mark W. Verbrugge, Troy, Mich.

[73] Assignee: General Motors Corporation, Detroit, Mich.

[21] Appl. No.: 941,018

[22] Filed: Sep. 4, 1992

[51] Int. Cl.$^5$ ............................................. C25D 5/02
[52] U.S. Cl. .................................................. 205/118
[58] Field of Search ........................................ 205/118

[56] References Cited

U.S. PATENT DOCUMENTS

| | | | |
|---|---|---|---|
| 4,044,193 | 8/1977 | Petrow et al. | 429/40 |
| 4,272,353 | 6/1981 | Lawrance et al. | 204/283 |
| 4,326,930 | 4/1982 | Nagel et al. | 205/164 |
| 5,084,144 | 1/1992 | Reddy et al. | 205/161 |

OTHER PUBLICATIONS

NSF Program, SBIR-1988 Phase I, entitled "High Utilization Carbon Supported Platinum Electrocatalyst for Solid Polymer Electrolyte Fuel Cells (TR-946)" covering work performed by Reddy et al, NSF Award No. ISI-8861029 Award Period Jan. 1 1989 to Sep. 30 1989.
Technic Inc, Platinum TP, (no date available).
A. D. Jannakoudakis et al, Synthetic Metals, 10 (1984/85) pp. 131–140.
E. A. Ticianelli et al, J. Electrochem. Soc., vol. 135, No. 9, pp. 2209–2214 (1988).
T. Maoka, Electrochimica Acta, vol. 33, No. 3, pp. 379–383 (1988).
T. Maoka, Electrochimica Acta, vol. 33, No. 3, pp. 371–377 (1988).
E. A. Ticianelli et al., J. Electroanal Chem; 251 (1988) pp. 275–295.
P. S. Fedkiw et al, Electrochem. Soc., vol. 136, No. 3 (1989).
N. Georgolios et al, J. Electroanal. Chem., 264 (1989), pp. 235–245.
S. Mukerjee, Journal of Applied Electrochemistry, 20 (1990), pp. 537–548.
S. Srinivasan et al, Journal of Power Sources, 29 (1990), pp. 367–387.
D. M. Bernardi et al, AICHE Journal, Aug. 1991, vol 37, No. 8.
M. S. Wilson et al, J. Electrochem. Soc., vol. 139, No. 2, Feb. 1992.
E. J. Taylor et al, J. Electrochem. Soc., vol. 139, No. 5, May 1992.

Primary Examiner—T. M. Tufariello
Attorney, Agent, or Firm—Lawrence B. Plant

[57] ABSTRACT

The method of the invention deposits positively charged metal species, preferably platinum-amine, at sites where the negatively charged sulfonic acid groups of the SPE are in contact with carbon. Then an electrochemical reaction causes formation of elemental metal (platinum) particle from the metal species at these sites. Platinum localization is achieved by electro-depositing platinum from a dilute electrolyte consisting essentially of tetramine platinum (II) chloride $Pt(NH_3)_4Cl_2$ electrolytes. Copper deposition is achieved by electrodepositing copper from a dilute electrolyte consisting essentially of copper sulfate.

20 Claims, 4 Drawing Sheets

METHOD OF MAKING ELECTRODES FOR ELECTROCHEMICAL CELLS AND ELECTRODES MADE THEREBY

FIELD OF THE INVENTION

This invention relates to membrane-electrode assemblies for use with electrochemical cells having solid polymer electrolyte membranes.

BACKGROUND OF THE INVENTION

Electrochemical cells are desirable for various applications when operated as fuel cells. During operation, fuel cells typically consume hydrogen and oxygen or air to provide electrical power. Although such cells are used in space applications, they have not been favored for transportation use. The cost of power produced by a fuel cell is several orders of magnitude greater than the cost of other power generation alternatives, partly because of the poor utilization of precious metal catalysts in conventional electrodes. However, power produced from hydrogen is desirable because hydrogen is environmentally acceptable and hydrogen fuel cells are efficient. Important features of a fuel cell include reaction surfaces, catalysts, ion conductive media, and mass transport media. Such features are typically included in membrane-electrode assemblies of a fuel cell. Therefore, it is desirable to improve the catalyst utilization in such assemblies to render fuel cells more attractive for transportation use.

SUMMARY OF THE INVENTION

There is provided a process for making an electrode for an electrochemical cell which basically includes first forming a substrate with a region which comprises proton conductive material intermingled with an electrically conductive material The proton conductive material has a plurality of acid groups, preferably sulfonic acid groups, with each of the groups having a replaceable cation, typically $H^+$.

The substrate is placed opposite a counter-electrode in an electrochemical cell containing an aqueous solution of positively charged metal-containing species or ions, preferably platinum-ammine ions, and a corresponding anion, chlorine, formed from the preferred electrolyte $Pt(NH_3)_4Cl_2$. A current is impressed across the cell at a potential sufficient to deposit at least one metal catalyst particle from the metal-containing species (ions) at each one of several sites of the substrate where the proton conductive material of the substrate is in contact with the electrically conductive material. The depositing of the metal catalyst, in the region where the two materials are in contact, renders the region catalytically active.

The terms "metal-containing species", "metal-containing ions", and "metal species" all refer to an atom or group of atoms containing a metal and typically having a positive charge. The term "metal complex" refers to a group of atoms containing a metal and typically having a positive charge.

In the preferred method, an active layer approximately 10 microns in depth is deposited at the region where the proton conductive material is in contact with the electrically conductive material, thus providing a catalytically active layer only at sites where the two materials are in contact. This provides a very thin catalytically active region in which dissolved gaseous reactants of an electrochemical cell can contact ions supplied by the membrane and an electrochemical reaction can occur at the catalyst site (i.e. Pt clusters).

In order to optimize deposition of catalyst in a thin active region or layer, the aqueous solution has a molar concentration of the positively charged metal species which is not greater than the equivalent molar concentration (fixed-charge concentration) of the proton conductive material. More specifically, the positively charged metal species are present in the bulk aqueous solution in an amount sufficient to provide the equivalent of not more than 1 atom of metal, preferably platinum, for each one of the acid groups of the proton conductive material Desirably, not more than one metal atom for every 10 of the acid groups, and preferably not more than one metal atom for every 100 of the acid groups. Preferably, the proton conductive material is perfluorocarbon sulfonic acid polymer and the acid groups are sulfonic acid groups having a replaceable $H^+$ cations.

Preferably, to enhance performance of the electrode when used in an electrochemical cell, the proton conductive material consists of a mixture of the preferred perfluorocarbon sulfonic acid polymer and poly(tetrafluoroethylene). The electrically conductive material preferably consists of high surface area carbon.

Advantageously, the method which relies upon deposition from an ammine complex utilizes a positively charged complex with a configuration and a charge most suitable for insertion into the substrate structure at and adjacent sulfonic acid groups and negatively charged groups of the substrate.

Preferably in the method, the only electrolyte species in the solution is the positively charged metal-containing cation and its corresponding anion forming the binary electrolyte. The method of the invention advantageously deposits metal from its salt without interference from, or the need for, other electrolytes in the aqueous solution Other metals, besides platinum, which are deposited by the method include copper using a copper sulfate electrolyte which produces a positively charge copper species (cation, $(Cu)^{+2}$) and its sulfate (anion, $(SO_4)^{-2}$).

In the case of platinum, the platinum-ammine ion provides a strong columbic force to obtain selective placement of the platinum. Advantageously, the platinum-ammine of the invention is readily soluble in water as part of its binary electrolyte, and this coupled with the low concentrations required for good selectivity and the simplicity rendered by no other electrolyte species being required, renders the invention suitable for commercial use.

These and other objects, features and advantages will become apparent from the following description of the preferred embodiments, appended claims and accompanying drawings.

DETAILED DESCRIPTION OF THE PREFERRED EMBODIMENTS

Figure 1:
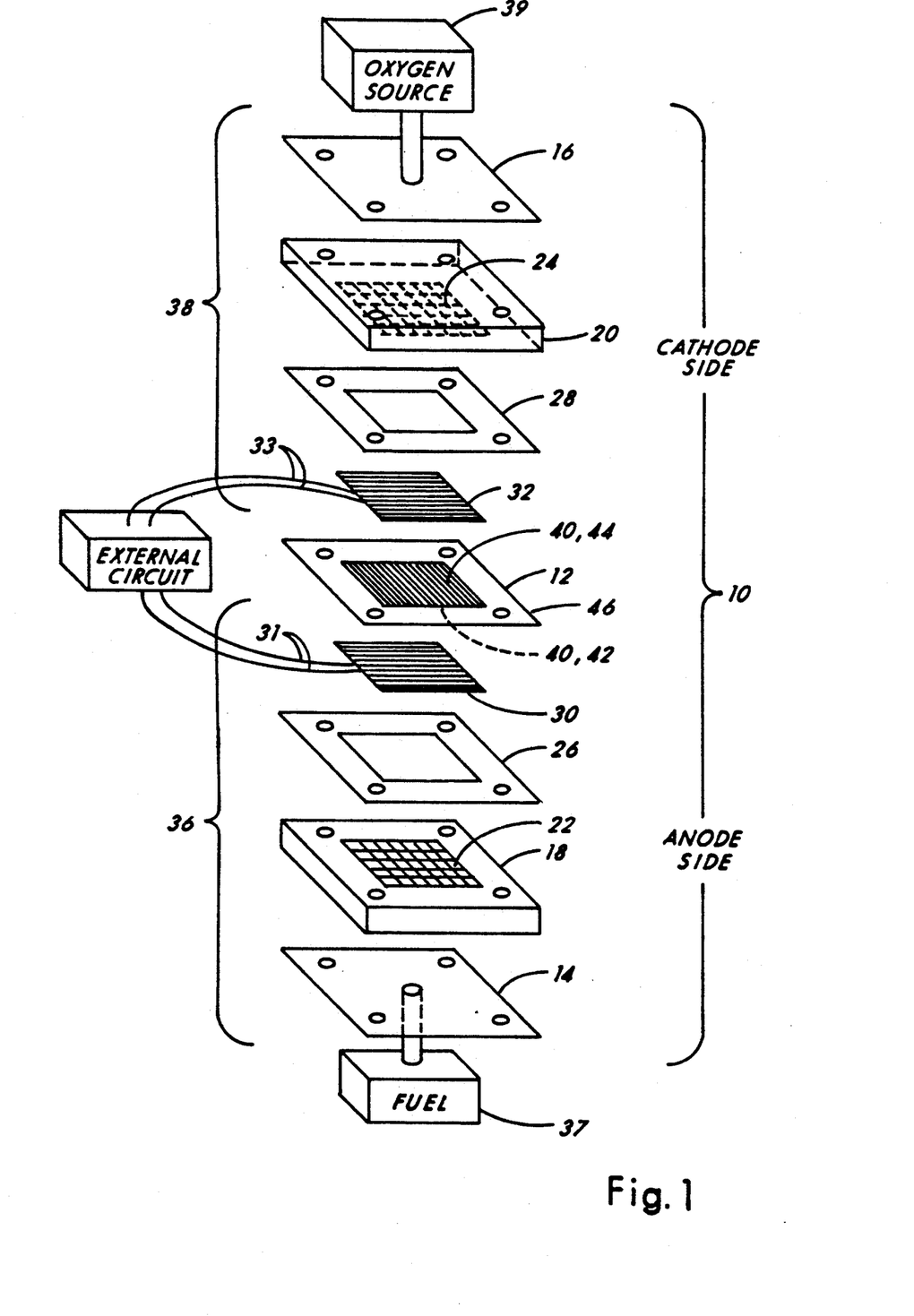
FIG. 1 is a schematic view of an unassembled electrochemical fuel cell having a membrane-electrode assembly with an electrode prepared according to the invention.

Referring to FIG. 1, an electrochemical cell 10 with a combination membrane-electrode assembly (MEA) 12 incorporated therein is shown in pictorial unassembled form. Electrochemical cell 10 is constructed as a fuel cell. However, the invention described herein is applicable to electrochemical cells generally. Electrochemical cell 10 comprises stainless steel endplates 14,16, graphite blocks 18,20 with openings 22,24 to facilitate gas distribution, gaskets 26,28, carbon cloth current collectors 30,32 with respective connections 31,33 and the MEA 12. The two sets of graphite blocks, gaskets, and current collectors, namely 18, 26, 30 and 20, 28, 32 are each referred to as respective gas and current transport means 36,38. Anode connection 31 and cathode connection 33 are used to interconnect with an external circuit which may include other fuel cells.

Electrochemical fuel cell 10 includes gaseous reactants, one of which is a fuel supplied from fuel source 37, and another is an oxidizer supplied from source 39. The gases from sources 37,39 diffuse through respective gas and current transport means 36 and 38 to opposite sides of the MEA 12.

Figure 2:
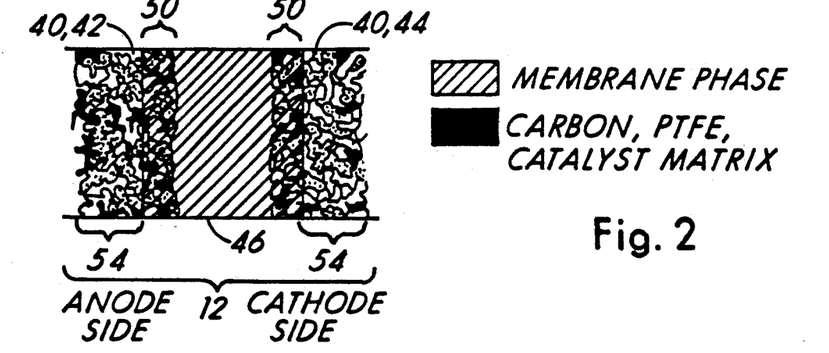
FIG. 2 is an illustration of a cross-section of a membrane-electrode assembly with electrodes prepared according to the method of the invention.

FIG. 2 shows a schematic view of the assembly 12 according to the present invention. Referring to FIG. 2, porous electrodes 40 form anode 42 at the fuel side and cathode 44 at the oxygen side. Anode 42 is separated from cathode 44 by a solid polymer electrolyte (SPE) membrane 46. SPE membrane 46 provides for ion transport to facilitate reactions in the fuel cell 10.

SPE Membrane

The solid polymer electrolyte (SPE) membrane 46, of the present invention is well known in the art as an ion conductive material. Typical SPE membranes are described in U.S. Pat. Nos. 4,272,353 and 3,134,697, and in Journal of Power Sources, Volume 29 (1990), pages 367–387.

The SPE membranes or sheets are ion exchange resin membranes. The resins include ionic groups in their polymeric structure; one ionic component of which is fixed or retained by the polymeric matrix and at least one other ionic component being a mobile replaceable ion which may be viewed as being electrostatically associated with the fixed component. The ability of the mobile ion to be replaced under appropriate conditions with other ions imparts ion exchange characteristics to these materials.

The ion exchange resins can be prepared by polymerizing a mixture of ingredients, one of which contains a constituent that can be rendered ionic. One broad class of cation exchange, proton conductive resins is the so-called sulfonic acid cation exchange resin. In the sulfonic acid membranes, the cation exchange groups are hydrated sulfonic acid species which are attached to the polymer backbone.

The formation of these ion exchange resins into membranes or sheets is also well known in the art. The preferred type is perfluorinated sulfonic acid polymer electrolyte in which the entire membrane structure has ion exchange characteristics. These membranes are commercially available, and a typical example of a commercial sulfonated perfluorocarbon, proton conductive membrane is sold by E.I. Dupont de Nemours & Co. under the trade designation NAFION. Another is sold by Dow Chemical.

In the electrochemical fuel cell 10 of the invention, the membrane 46 is a cation permeable, proton conductive membrane, having H$^+$ions as the mobile ion; the fuel gas is hydrogen and the oxidant is oxygen or air. The overall cell reaction is the oxidation of hydrogen to water and the respective reactions at the anode 42 and cathode 44 are as follows:

$$H_2 = 2H^+ + 2e$$

$$\tfrac{1}{2}O_2 + 2H^+ + 2e = H_2O$$

Electrodes

The invention provides electrodes 40 for use with MEA 12 of cell 10. The electrode comprises a proton conductive (SPE, NAFION) material similar to or the same as the material which forms the membrane. Each gas-diffusion electrode 40 is composed of electronically conductive material that has been made substantially hydrophobic by the addition of PTFE. (FIG. 2.) The system is considered to be composed of three regions: a membrane region of hydrated solid polymer electrolyte, active catalyst layer 50, which is formed by the overlap of the membrane 46 and the gas-diffusion electrode 40, and a region termed the gas-diffuser 54. The portion of the gas-diffusion electrode 40 that does not contain membrane 46, which we call the gas-diffuser 54, provides for species transport. Electrons move through the electronically conductive portion consisting of carbon and catalyst (represented by the blackened area of the gas-diffusion electrode in FIG. 2). Gaseous species (clear area) move through open pores wet-proofed by PTFE. Liquid water (stippled portion) flows through channels that are not lined with PTFE.

Active Catalyst Layer

The active catalyst layer 50 is a very thin region, in which dissolved gaseous reactants can contact ions supplied by the membrane and electrochemical reaction can occur at the catalyst sites (i.e. Pt clusters). In the active catalyst layer 50, the membrane phase is depicted as penetrating the wet-proofed pores as well as pores that are not lined by PTFE. (In reality, a fraction of these pores may not be filled with membrane phase, and the boundary is diffuse and not sharp as shown in FIG. 2.)

The method of the invention deposits catalyst particles, such as platinum or copper, in an active region called the active layer 50 of the electrode where there is ionic contact with the proton conducting material (i.e. proton exchange membrane solid polymer electrolyte), and electronic contact with carbon substrate (i.e. high surface area carbon particles). Since such contact promotes catalyst utilization, a lesser amount of catalyst is required. The method of the invention advantageously deposits metal from its salt without interference from, or the need for, other electrolytes in the aqueous solution.

Copper and other metals which form salts with sulfonic acid groups are deposited from an aqueous solution, preferably containing only the metal salt (electrolyte) species, namely, positively charged copper ($Cu^{+2}$) and its corresponding anion ($SO_4^{-2}$). Platinum is deposited from an aqueous solution, preferably containing only the ions of tetrammine platinum (II) chloride, ($Pt(NH_3)Cl_2$), namely, positively charged platinum ammine species and its corresponding anion, chloride.

More specifically, the method of the invention deposits positively charged metal species at sites where the negatively charged sulfonic acid groups of the SPE are in contact with carbon. Then an electrochemical reaction causes formation of elemental metal (platinum or copper) particle from the complexes at these sites. In the case of platinum, the suitably small positively charged metal-complex of the invention is preferred and is able to occupy such sites, providing the platinum localization and the highest catalyst utilization possible. This is important in the case of platinum which is one of the most costly catalysts, and one for which a suitably small positively charged complex has not heretofore been found.

The terms "metal-containing species", "metal-containing ions", and "metal species" all refer to an atom or group of atoms containing a metal and typically having a positive charge The term "metal complex" refers to a group of atoms containing a metal and typically having a positive charge.

Platinum localization is achieved by electro-depositing platinum from a dilute electrolyte containing the specific platinum-ammine complex of the invention. Preferably, the solution consists essentially of tetrammine platinum (II) chloride $Pt(NH_3)_4Cl_2$ electrolytes, namely, the platinum-ammine ion $Pt(NH_3)_4$ with a plus two (+2) charge and chlorine with a negative charge (anion corresponding to the cation complex). This is basically a post-catalyzation procedure in that the gas-diffusion electrode and/or membrane-electrode assembly is catalyzed after the electrode and/or membrane assembly has been prepared.

Figure 3:
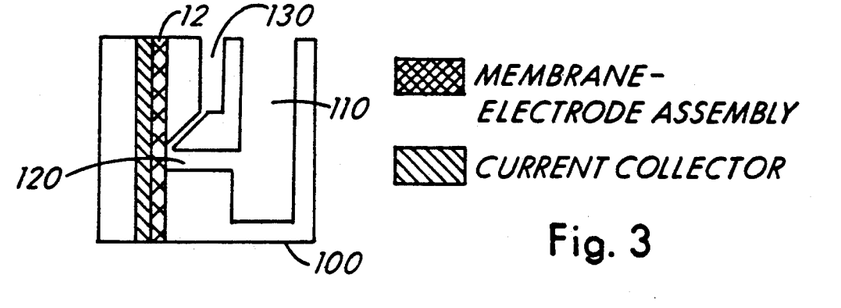
FIG. 3 is a schematic view of a cell for electrochemical deposition.

Gas-diffusion electrodes were prepared by the method of the invention using an electrochemical cell 100 as schematically shown in FIG. 3. The reservoir 110 was well stirred. The circular channel 120 linking the membrane-electrode assembly and the reservoir had a cross-sectional area of 1 $cm^2$. The channel length to diameter ratio was greater than or equal to 3 providing essentially uniform current distribution over the membrane-electrode assembly. The deposition was conducted by setting the potential of the gas-diffusion electrode relative to a reference 130 using reference electrode part 130 opposite and adjacent the electrode of assembly 12. The electrochemical deposition of platinum was conducted at about room temperature (about 22° C.) using reagent grade chemicals and distilled deionized water. Temperatures in the range of about 20° C. to about 90° C. are suitable. The platinum-ammine salt used to deposit platinum was $Pt(NH_3)_4Cl_2$ obtained from PGP Industries, a subsidiary of Gerald Metals.

The general method for preparing the substrate (electrode and/or membrane-electrode assembly) was as follows. Colloidal poly(perfluorosulfonic acid)-alcohol solutions were obtained from Solution Technologies Inc. This solution was used to impregnate a gas-diffusion electrode with the poly(perfluorosulfonic acid). This poly(perfluorosulfonic acid) applied from solution is essentially the same composition as the membrane solid polymer electrolyte; and is also referred to as NAFION. The membrane is polymerized perfluorosulfonic acid. As indicated by a compositional profile analysis, to be discussed later, the membrane impregnated region of the gas-diffusion electrode ranged from 5 to 10 microns in thickness.

The gas-diffusion electrodes were formed from high surface area carbon having a BET surface area in the range of 200 to 900 $m^2$/gram and poly(tetrafluoroethylene) (PTFE). Alternatively, Prototech gas-diffusion electrodes were used and essentially were of the same composition.

EXAMPLE 1

Gas-diffusion electrodes used as substrates in the experiments were prepared in the form of an essentially planar carbon electrode using high surface area carbon. Carbon was dispersed in an acified aqueous solution to which Teflon binder was added using a dilute suspension of tetrafluoroethylene (PTFE) from Dupont. The resulting slurry was applied to a porous carbon paper substrate to form a uniform layer and then treated with a hydrophobic polymer, and then pressed and heated. The resulting electrode had a gas permeable face and an opposite face comprising the electronically conductive high surface area carbon and Teflon binder.

As described above in connection with the general method, a thin layer of NAFION, the proton conductive material was then applied to the substrate to form the membrane portion of the membrane-electrode assembly. The NAFION in the form of the colloidal poly(perfluorosulfonic acid)-alcohol solution obtained from Solution Technology was applied to the face of the electrode. Electrodes were placed in the cell 100 as shown in FIG. 3 which contained a 10 millimolar $Pt(NH_3)_4Cl_2$ solution (0.01 molar concentration). The deposition was conducted by setting the potential of the gas-diffusion electrode at $-2$ volts relative to an Ag-/AgCl reference which yielded a constant current density of 100 micro-amps/$cm^2$. The silver/silver chloride reference electrode was filled with saturated potassium chloride. Potential or current control of the cell was provided by an EG & G Princeton Applied Research Potentiostat/Galvanostat model 273. A Nicolet 4094B digital storage oscilloscope was used to collect data.

After impregnation (electrodeposition of catalyst) a poly(perfluorosulfonic acid) membrane (Dupont NAFION 117) was hot-pressed onto the impregnated gas-diffusion electrode to form a membrane-electrode assembly. To form a complete assembly, electrodes were applied to both sides. Thus, electrodes for both the anode and cathode side of the membrane are formed by the method of the invention.

EXAMPLE 2

The method of Example 1 was followed except that before electrodeposition the uncatalyzed electrode was placed in a solution of the Pt(NH$_3$)$_4$Cl$_2$ platinum-ammine aqueous solution) and permitted to soak for a time sufficient to permit equilibration.

Prior to electrodeposition, solutions were purged or sparged with purified inert nitrogen gas to remove potentially reactive gases such as oxygen before entering the deposition cell.

EXAMPLE 3

The basic method of Example 1 was used to electrodeposit catalyst on electrode substrates via a rotating disk method. For this purpose a Pine Instrument Company apparatus was used to form rotating disk electrodes, as is typical in the art, using a suitable rotator.

In this method, glassy carbon disks of 5 mm diameter housed in PTFE were used. A sweep-rate of 100 mV/s was employed along with the rotation speed of 1,000 rpm. Platinum was deposited at between 0 and −0.8 volts with reference to the Ag/AgCl reference electrode. At potentials negative to −1 volt, hydrogen evolved on the electrode surface. For potentials greater than 0.5 volts, oxygen evolved. It was found that if the concentration of metal-amine complex was too low, then reactions involving the break down of solvent molecules often dominated. Thus, an aqueous solution of 1 mM concentration was found to be not practical for platinum deposition, as it is simply too dilute. Good results were obtained at the concentration of 10 mM Pt(NH$_3$)$_4$Cl$_2$.

EXAMPLE 4

The method of the invention as described in Example 1 was used to deposit copper catalyst from an aqueous copper sulfate solution, the primary ions being Cu$^{2+}$ and SO$_4^{2-}$. The cell geometry of FIG. 3 was employed, and a 20 mM CuSO$_4$ solution was used. A low-duty-cycle, rectangular-pulse current regime was employed to reduce mass transport limitations. During the 100 milliseconds of current passage, the current density was maintained at 1 mA/cm$^2$; one second of open circuit followed each deposition period. The deposition was carried out for 1 hour. Assuming that the overall electrode corresponds to: Cu$^{2+}$ +2$e^-$ Cu, then the copper loading is 0.1 mg/cm$^2$ based on the projected electrode area (1 cm$^2$). A line scan obtained by electron-probe microanalysis showed that almost all of the copper is deposited at the membrane/gas-diffusion electrode interface.

Several key features of the method, as described in the foregoing examples, should be noted Two electrolyte features are required for the selective deposition of catalyst 1) the cations of the electrolyte must correspond to the element (or elements) yielding the catalyst; and 2) the concentration of the cations must be much lower than that of the membrane fixed-charges. The fixed-charge concentration is the number of charged membrane sites per unit volume that have a charge opposite in sign to that of the catalyst ion. The fixed-charge concentration of the most frequently used electrolyte for membrane-electrolyte fuel cells, NAFION 117, and other promising poly(perfluorosulfonic acid) electrolytes is about 1 mol/L based on the total membrane volume. If the catalyst cation concentration is too low, then it may be possible to reduce the solvent prior to catalyst deposition; for deposition from an aqueous solution, for example, the reduction of water. Preferably, the concentration of metal-ammine than one atom of metal for every one of the sulfonic acid groups, desirably not more than one metal for every atom 10 groups, and preferably not more than one metal atom for every 100 sulfonic acid groups. The preferred concentration which provides one metal atom per 100 acid groups is 10 mM pt(NH$_3$)$_4$Cl$_2$ (0.01 molar); concentrations of 1 mM (0.001 molar) were not suitable.

Figure 4:
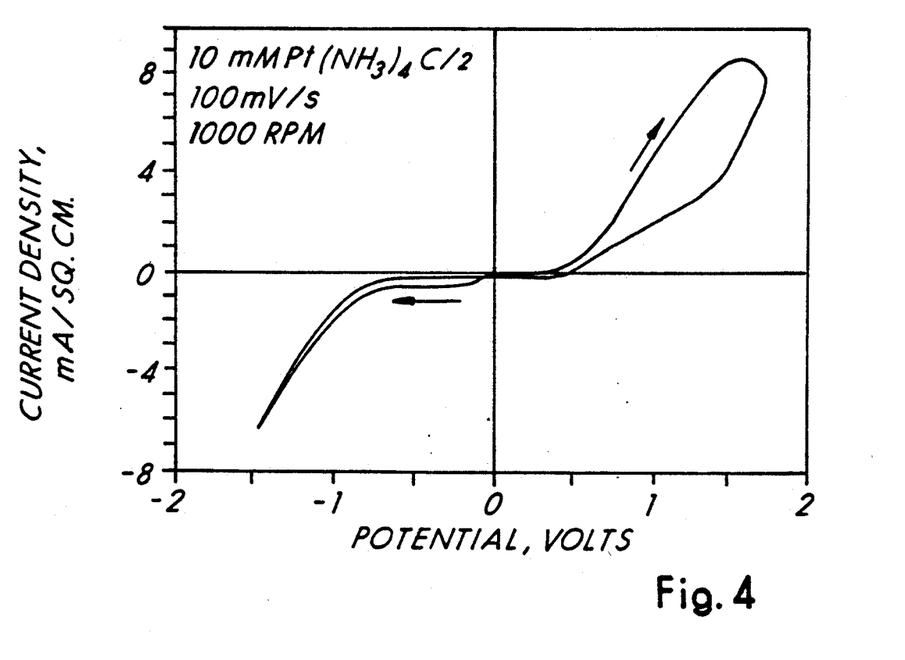
FIG. 4 is cyclical voltammogram for deposition of Pt onto a glassy carbon electrode from an aqueous 10 mM Pt(NH$_3$)$_4$Cl$_2$ solution (0.01 molar concentration).
Figure 5:
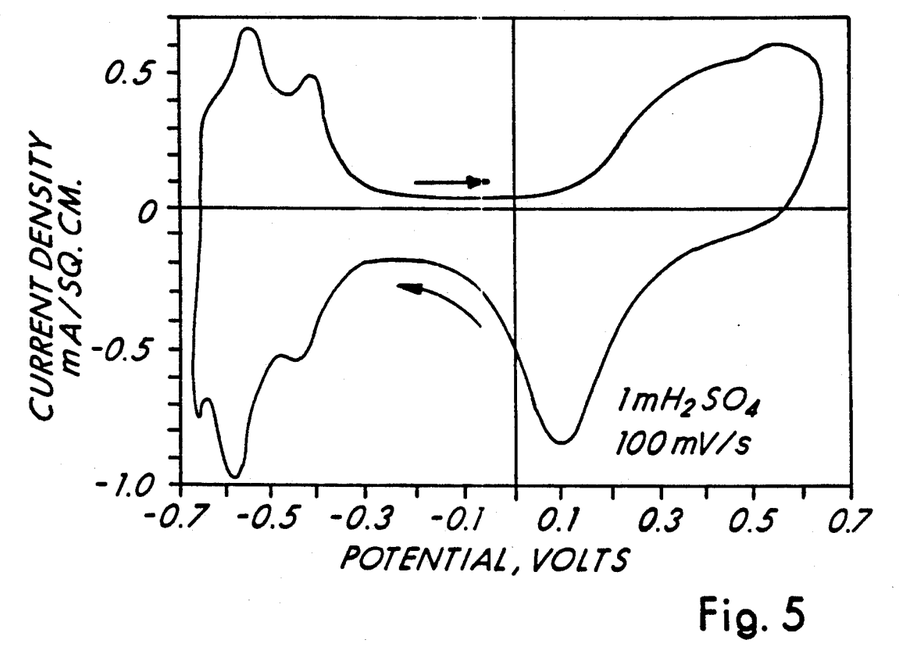
FIG. 5 is a cyclic voltammogram of a glassy carbon electrode coated with platinum deposited from 10 mM Pt(NH$_3$)$_4$Cl$_2$ similar to and in verification of the results of FIG. 4. A 0.5 molar sulfuric acid electrolyte was employed.

The deposition of platinum from the preferred 10 mM solution, used to produce the data of FIG. 4, was verified by examining the disk surface using energy dispersive x-ray analysis. An additional verification of platinum deposition is embodied in the results of FIG. 5. To prepare the example electrode used to obtain the data of FIG. 5, the disk was placed in the 10 mM Pt(NH$_3$)$_4$Cl$_2$ solution, rotated at 1,000 rpm, and subjected to a constant potential of −0.75 V versus the Ag/AgCl reference electrode for 1 hour. After the deposition, the electrode was given a thorough rinse in sulfuric acid, placed in a quiescent 1 M sulfuric acid solution, and the potential was scanned at 100 mV/s between −0.65 and 0.65 V versus a Hg/Hg$_2$SO$_4$ reference electrode. The voltammogram of FIG. 5 is a well-known signature for the platinum/sulfuric-acid system.

Physical examination of the membrane-electrode assembly was conducted from cross-sections mounted in epoxy and polished. For physical examination of the membrane-electrode assemblies, cross-sections were mounted in epoxy and polished to 0.1-$\mu$m roughness. Electron-probe microanalysis (Cameca Instrument Incorporated, model MBX) was used to determine profiles of various species across the cross-sectioned membrane-electrode assemblies. This technique allows for the compositional analysis of approximately 1-$\mu$m diameter spherical sample volumes. A scanning electron micrograph was obtained with backscattered electrons. Due to the high atomic number of platinum, relative to any other of the elements within the membrane-electrode assembly, backscattered electron micrographs provided a clear image of the metal deposit Such images clearly showed a well defined active layer of localized platinum.

More negative potentials were needed for platinum deposition with the cell as shown in FIG. 3, relative to the rotating disk electrode setup because of larger transport and resistance. At half hour of deposition and in accordance with Example 1, yields near 0.1 mg/cm$^2$ of platinum loading were obtained.

Figure 6:
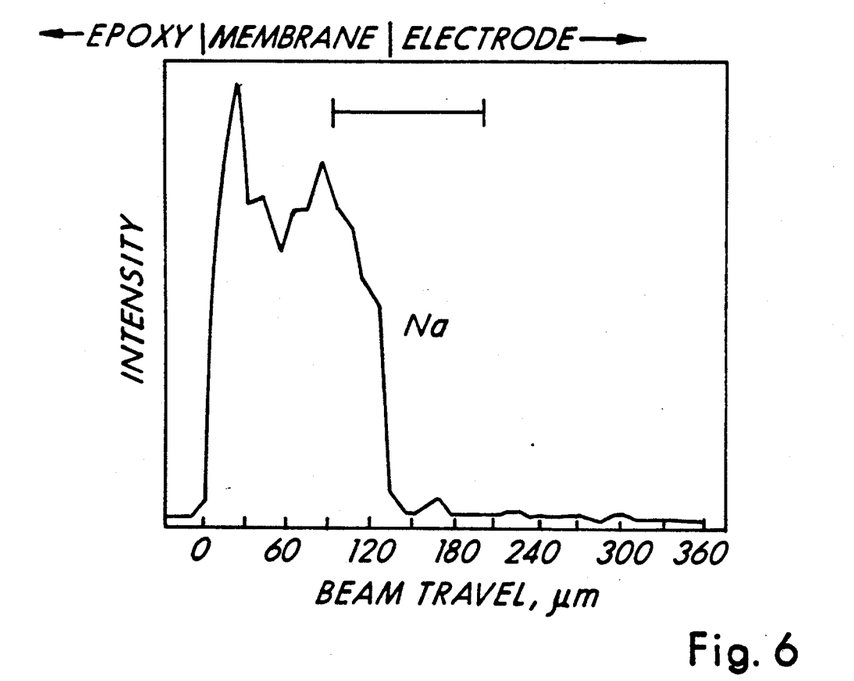
FIG. 6 is an atomic profile using sodium to identify membrane and electrode regions of the membrane-electrode assembly of the invention.
Figure 7:
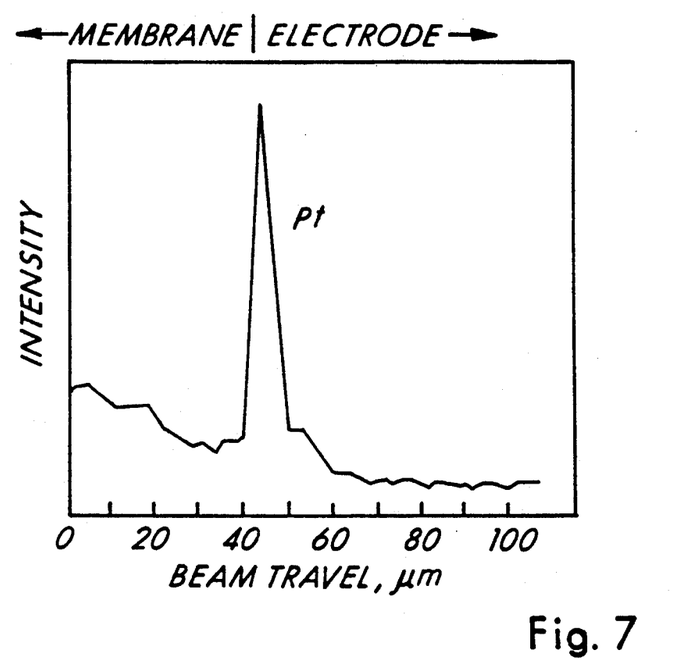
FIG. 7 is a platinum profile across the membrane-electrode assembly of FIG. 6 showing that platinum has been deposited in the very narrow catalyst layer, defined by the overlap of the membrane and electrode regions of FIG. 6.

In further attempts to characterize the cross-sectioned electrodes, sodium was used to discriminate between the different regions of the membrane-electrode assemblies. After the platinum was deposited onto the gas-diffusion electrode, the membrane-electrode assembly was soaked in a 0.1 M NaOH solution. The electron-probe data of FIG. 6 show the resulting sodium profile, which was used to identify the membrane and gas-diffusion electrode regions. The region corresponding to the horizontal bar of FIG. 6, which crosses over the membrane/gas-diffusion electrode interface, is shown in FIG. 7. In agreement with the micrograph, the Pt profile of FIG. 7 indicates that a high Pt concentration is observed at the membrane/gas-diffusion electrode interface, which corresponds to the active catalyst layer in a membrane-electrolyte fuel cell.

Figure 8:
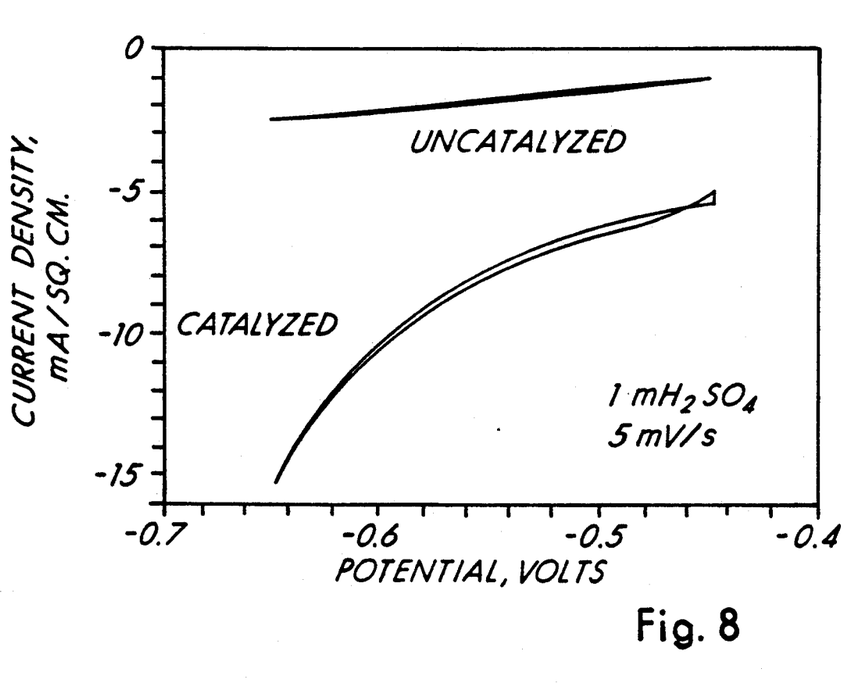
FIG. 8 is a current potential trace in the hydrogen region for catalyzed and uncatalyzed membrane-electrode assemblies.

The electrochemical studies corresponding to the results shown in FIG. 8 were completed prior to the electron-probe microanalysis of the membrane-electrode assemblies. The voltammograms of FIG. 8 are shown as proof of catalyzation. The current potential traces of FIG. 8 were obtained using the cell shown in FIG. 3 and a slow scan rate of 5 mV/s. The curve labelled "Uncatalyzed" was typical of the uncatalyzed membrane-electrode assemblies. The curve labelled "Catalyzed" refers to the electrode investigated in FIGS. 6 and 7. The experiments of FIG. 8 utilized a potential sweep from −0.45 to −0.65 V relative to a Hg/Hg$_2$SO$_4$ reference electrode.

It is helpful to compare the catalyzed membrane-electrode assembly of FIG. 7 with the most commonly used gas-diffusion electrode in membrane-electrolyte fuel cells, which is made by the Prototech Company. Standard Prototech gas-diffusion electrodes typically contain two regions. The region designed to be adjacent to the membrane in a membrane-electrolyte fuel cell contains the platinum (usually in an oxidized state) and is typically about 80-μm thick. A platinum loading of 0.5 mg/cm$^2$, based on the projected electrode area, is commonly used. The Prototech electrode had significant extra Pt unavailable for electrochemical reaction because the Pt was distributed over portions of electrodes outside the active layer formed by the membrane and the gas-diffusion electrode, which is less than 10-μm thick. Modeling studies of membrane-electrolyte fuel cells indicated that active layers of thicker than 10-μm resulted in low catalyst utilization due to transport limitations of dissolved oxygen and hydrogen in the active layer. Thus, the method of the invention provides at least an order of magnitude reduction in catalyst costs for membrane-electrolyte fuel cells.

It should be noted that the concepts set forth here could also be used to deposit other catalysts or more than 1 catalytic species within the active layer of a gas-diffusion electrode. Other catalysts include various precious metals such as palladium and other metals such as tin. For a multi-component catalyst, the total metal cation concentrations need to be kept below the membrane fixed-charge concentration for selective deposition, as described earlier.

As stated earlier, the method utilizes two unique conditions to ensure catalyst localization: 1) the only cation of the electrolyte corresponds to the element yielding the catalyst; and 2) the concentration of the cation must be much lower than that of the fixed-charges within the membrane. In addition to these conditions, a solvent must be chosen that does not react in preference to catalyst deposition. It is possible, for example, to use non-aqueous solvents to avoid solvent decomposition. The preferred electrolyte is the aqueous Pt(NH$_3$)$_4$Cl$_2$ electrolyte. Comparison of the catalyzed membrane-electrode assemblies of this work with those that are commercially available indicates that an order of magnitude reduction from the standard platinum loading is foreseeable. Three other aspects of the proposed method of catalyzation yield improved membrane-electrode assembly performance in membrane-electrolyte fuel cells. First, since the catalyst is applied after the gas-diffusion electrode is formed, no catalyst is lost due to coverage by inert binder (usually poly(tetrafluoroethylene)). Second, the catalyst profile across the region of membrane/gas-diffusion electrode overlap, which forms the active layer in a membrane-electrolyte fuel cell, is similar to that of the membrane profile throughout the active layer, indicative of a constant platinum to a fixed-charge concentration ratio. Third, since the catalyst counterion is immediately adjacent to a membrane fixed-charge site prior to deposition, the subsequent use of the membrane-electrode assembly in a membrane-electrolyte fuel cell results in less kinetic losses at the electrodes, as nearly all of the catalyst particles are adjacent to membrane fixed-charge sites on an atomic scale.

While this invention has been described in terms of certain embodiments thereof, it is not intended that it be limited to the above description, but rather only to the extent set forth in the following claims.

The embodiments of the invention in which an exclusive property or privilege is claimed are defined in the appended claims.

We claim:

1. A process for making an electrode for an electrochemical cell, comprising:
    a) forming a substrate having a region comprising proton conductive material intermingled with electrically conductive material, the proton conductive material having a plurality of acid groups each having a replaceable cation;
    b) making the substrate a cathode in an electrochemical cell opposite a counter-electrode, said cell containing an aqueous electrolyte solution consisting essentially of platinum-ammine complex cations and anions corresponding to said platinum-ammine cations, wherein the molar concentration of said platinum-ammine cations in said solution is less than the molar concentration of said replaceable cation in said proton conductive material, but sufficient to preclude electrolysis of the H$_2$O in said aqueous solution; and
    c) impressing a current across the cell at a potential sufficient to deposit platinum catalyst particles primarily at each of a plurality of sites where the proton conductive material is in contact with the electrically conductive material in the region to render the region catalytically active.

2. The process according to claim 1, wherein the anion consists essentially of chloride.

3. The process according to claim 1, wherein the molar concentration of said platinum-ammine cations is no more than about 1/10th the concentration of the replaceable cation and the step of impressing the current to deposit the platinum is conducted by placing at least one of the platinum-ammine cations adjacent at least one of the acid groups, separating the platinum from the ammine, electrolytically reducing the platinum to its elemental state and depositing it on said conductive material at said sites.

4. The process according to claim 1, wherein said platinum-ammine cation is present in the aqueous solution in an amount sufficient to provide the equivalent of not more than one atom of the platinum for every 100 of the acid groups.

5. The process according to claim 1, wherein the aqueous solution has a concentration of said platinum-ammine cation in the range of about 0.01 to about 0.1 moles per liter.

6. The process according to claim 1, wherein the proton conductive material comprises perfluorocarbon sulfonic acid polymer, and the electrically conductive material comprises high surface area carbon.

7. The process according to claim 1, wherein the proton conductive material consists essentially of a mixture of perfluorocarbon sulfonic acid polymer and poly(tetrafluoroethylene), and the electrically conductive material consists essentially of high surface area carbon.

8. The process according to claim 1, wherein the proton conductive material has a plurality of carboxylic acid groups each with a mobile replaceable cation.

9. The process according to claim 1, wherein before step (b) the substrate is maintained in an aqueous solution of said platinum-ammine cations for a time sufficient to replace at least a portion of the replaceable cations with the platinum-ammine cations thereby minimizing evolution of $H_2$ gas during step (c).

10. The process according to claim 1, wherein after step (c) the substrate is placed in a dilute sulfuric acid solution at a concentration and for a time sufficient to remove any undeposited platinum.

11. The process according to claim 1, wherein the acid groups are sulfonic acid groups and the replaceable cation is $H^+$.

12. The process according to claim 1 wherein said platinum-ammine complex cations consist essentially of platinum tetrammine.

13. The process according to claim 1 wherein the molar concentration of said platinum-ammine complex is between about 1/10th and 1/100th the molar concentration of said replaceable cation.

14. A process for making an electrode for an electrochemical cell, comprising:
   a) forming an electrically conductive carbon-based substrate having a region comprising proton conductive material intermingled with the electrically conductive material, the proton conductive material having a plurality of acid groups each having a replaceable cation;
   b) making the substrate a cathode in an electrochemical cell opposite a counter-electrode, said cell containing an aqueous inorganic electrolyte solution consisting essentially of cationic metal-containing species and its corresponding anion wherein the molar concentration of said species in said solution is no more than about 1/10th the molar concentration of said replaceable cation in said proton conductive material, but sufficient to preclude electrolysis of the $H_2O$ in said aqueous solution; and
   c) impressing a current across the cell at a potential sufficient to deposit metal catalyst particles from the metal-containing species primarily at each of a plurality of sites where the proton conductive material is in contact with the electrically conductive material in the region to render the region catalytically active.

15. The process according to claim 14, wherein the proton conductive material comprises perfluorocarbon sulfonic acid polymer, and the electrically conductive material comprises high surface area carbon.

16. The process according to claim 14, wherein the step of impressing the current to deposit the metal is conducted by placing at least one of the positively charged metal species adjacent at least one of the acid groups, and electrolytically depositing the metal in its elemental state onto said conductive material at said sites.

17. The process according to claim 14, wherein the positively charged metal species consists essentially of copper cations and the anion consists essentially of sulfate.

18. A process for making an electrode for an electrochemical cell, comprising:
   a) forming an electrically conductive carbon-based substrate having a region comprising proton conductive material intermingled with the electrically conductive material, the proton conductive material having a plurality of acid groups each having a replaceable cation;
   b) making the substrate a cathode in an electrochemical cell opposite a counts, electrode, said cell containing an aqueous solution consisting essentially of sufficient platinum tetrammine chloride ($Pt(NH_3)_4Cl_2$) electrolyte to provide platinum tetrammine ions in a concentration which is no more than the molar concentration of said replaceable cation in said proton conductive material; and
   c) impressing a current across the cell at a potential sufficient to deposit platinum particles from the electrolyte primarily at each of a plurality of sites where the proton conductive material is in contact with the electrically conductive material in the region to render the region catalytically active.

19. The process according to claim 18, wherein the proton conductive material comprises perfluorocarbon sulfonic acid polymer, and the carbon-based substrate comprises high surface area carbon.

20. The according to claim 19, wherein the aqueous solution has a concentration of the platinum tetrammine chloride in the range of about 0.01 to about 0.1 moles per liter.

* * * * *